United States Patent [19]
Flannery et al.

[11] 3,778,826
[45] Dec. 11, 1973

[54] ANTI-COLLISION VEHICULAR RADAR SYSTEM

[75] Inventors: John B. Flannery; Paul D. Flannery, both of Chelmsford, Mass.

[73] Assignee: Merlin A. Pierson, Newton, Mass.

[22] Filed: Sept. 25, 1972

[21] Appl. No.: 291,567

Related U.S. Application Data

[63] Continuation of Ser. No. 889,237, Dec. 30, 1969, abandoned.

[52] U.S. Cl. ............... 343/7 ED, 180/98, 343/8
[51] Int. Cl. ....................... G01s 9/02, B60t 7/12
[58] Field of Search ............... 343/7 ED, 8, 112 CA; 333/11; 180/98

[56] References Cited
UNITED STATES PATENTS

| | | | |
|---|---|---|---|
| 2,949,603 | 8/1960 | Logue | 343/8 X |
| 3,046,548 | 7/1962 | Briskin | 343/112 CA X |
| 3,092,832 | 6/1963 | Schiffman | 343/8 |
| 3,448,822 | 6/1969 | LaLone et al. | 343/7 ED X |
| 3,525,993 | 8/1970 | Peace et al. | 343/8 |
| 3,710,383 | 1/1973 | Cherry et al. | 343/7 ED |
| 3,725,921 | 4/1973 | Weidman et al. | 343/7 ED |

Primary Examiner—T. H. Tubbesing
Attorney—John H. Pearson

[57] ABSTRACT

A simplified radar system mounted on a vehicle and having an unmodulated RF signal transmitter-receiver beamed along a path to reflect signals from any obstacle. A novel circuit including an assymmetrical magic tee; an opening and closing Doppler discriminator, a closing Doppler frequency sensing means, a transitory obstacle discriminator and an override means is arranged to control power means which pulses the brakes, when driver inattention, or fog, requires braking or turning in time to avoid collision. The system reacts only in emergency stop situations to avoid collision by substituting the relatively short reaction time of the Doppler sensing radar system for the relatively long reaction time of an operator and in being independent of all other parameters such as input from vehicle speedometer, distributor or the like.

9 Claims, 5 Drawing Figures

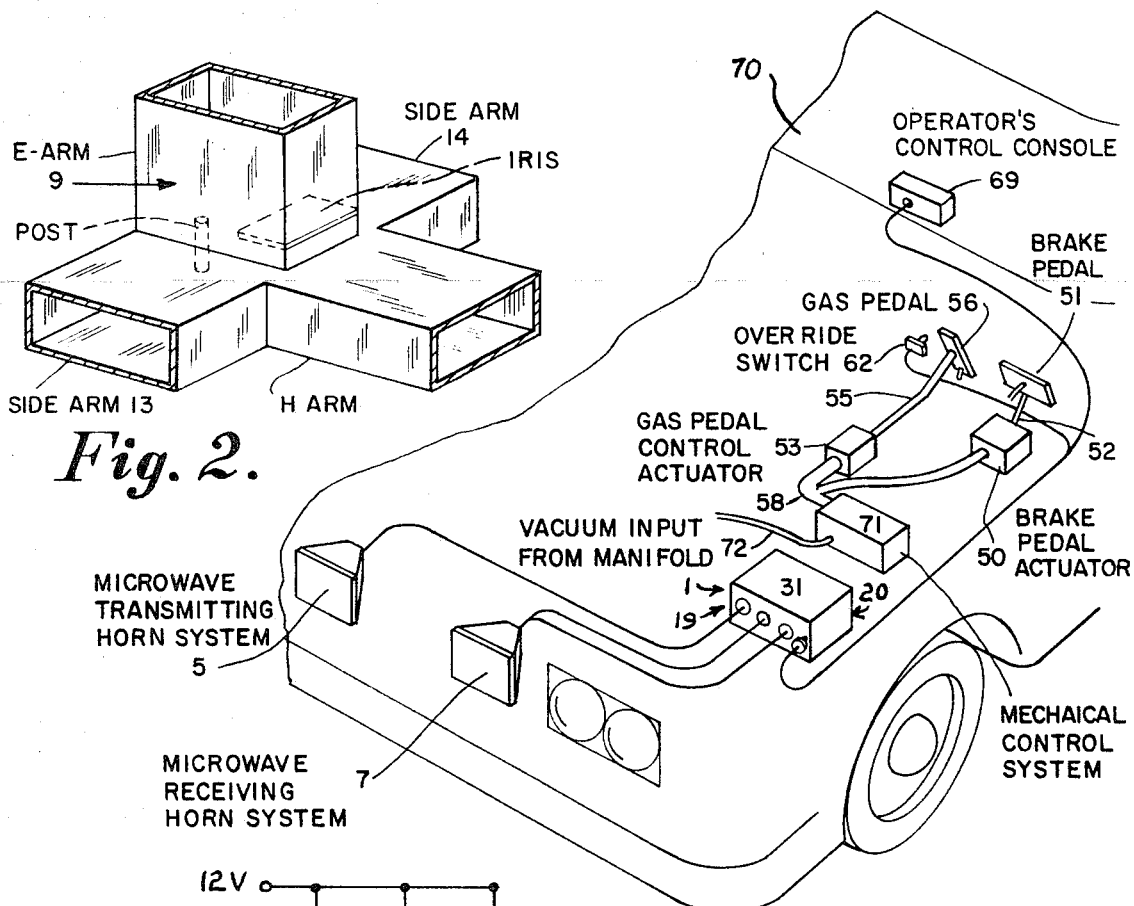
Fig. 2.
Fig. 3.
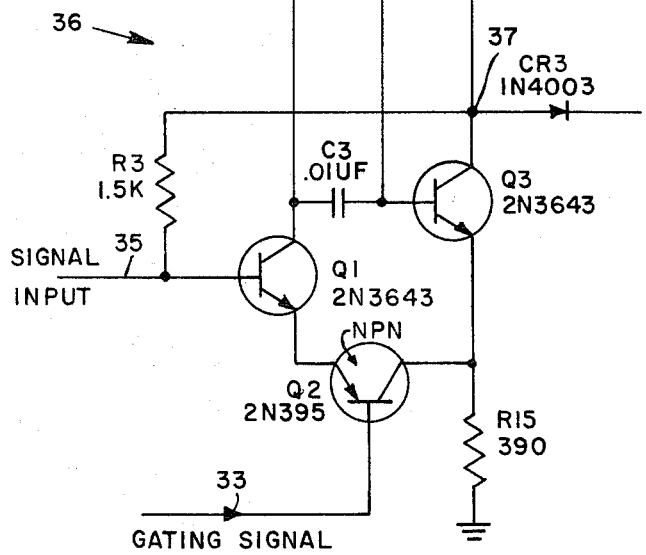
Fig. 4.
INVENTOR
JOHN B. FLANNERY
PAUL D. FLANNERY
BY Pearson + Pearson
ATTORNEYS

ANTI-COLLISION VEHICULAR RADAR SYSTEM

This is a continuation of application Ser. No. 889,237, now abandoned.

BACKGROUND OF THE INVENTION

Vehicular warning, control and speed measurement systems, which include the transmission and/or reflection of light, sonic or radio waves are well known. This invention relates especially to such systems in which high frequency radio waves are transmitted and received by a vehicle and the well known Doppler effect is sensed and utilized in controlling the vehicle.

There have been many vehicular radar systems proposed in the prior art, most of which are relatively expensive, or attempt to accomplish too many objectives or, rely on some electronic or mechanical component which is either not yet developed, or, if developed, may not be as accurate in use as is required for the purpose intended.

This invention relies only on commercially available, or easily manufactured, parts which are practical, tested and of relatively low cost and is designed to automatically perform the task of preventing a collision, if the operator fails to commence braking the vehicle before available reaction and stopping time runs out.

One prior art patent, U. S. Pat. No. 2,804,160 to Rashid of Aug. 27, 1957, is pertinent to this invention because the patentee discloses a somewhat similar combination which includes a self-contained, vehicle-mounted, RF transmitter-receiver, a Doppler detector, brake actuation means and control means causing deceleration as a function of vehicle speed, distance to the obstacle and closing rate. However, the Rashid system has certain possible disadvantages. For example, it assumes a direct relationship between distance and the amplitude of the received signal. Actually target strength of the obstacle, that is, whether a small sports car or a large trailer truck, greatly affects amplitude and failure to consider target strength gives rise to considerable error. Another possible disadvantage of the Rashid system is that it does not screen out opening Doppler from closing Doppler. Another is that it attempts to secure an indication of vehicle speed from a rheostat on the speedometer, such vehicle speedometers often being quite inaccurate depending on the cost or age of the vehicle.

"In U. S. Pat. No. 3,448,822 to Lalone of June 10, 1969, the desirability of screening out opening Doppler signals from closing Doppler signals, by using a magic tee is suggested, but the system requires an attenuator. Like Rashid above, the Lalone system is so costly as to be impractical and depends on speed - distance input from a moving part such as the speedometer or distributor.

U. S. Pat. No. 3,152,326 of Oct. 6, 1964 and U. S. Pat. No. 3,176,294 of Mar. 30, 1965 both to Marlo et al, are pertinent prior art because they disclose a self contained vehicle mounted transmitter-receiver and means for discriminating between opening and closing Doppler frequencies. However these patents teach the use of a modulated single side band frequency, rather than an unmodulated, high frequency RF signal and the single side band requires a costly transmitter not readily available commercially. Similarly the Doppler discriminator in these patents is a band pass filter stated to reject opening frequencies but such a filter is not believed to be practical or to be available in the art. Any such filter would have to be precisely turned to reject certain frequencies and any changes in conditions would require someone to vary the filter adjustment, this being impractical when the device was in use.

There are numerous other prior art patents relating to vehicular radar systems such as U.S. Pat. No. 2,679,865 to Barker of Feb. 24, 1953 in which Doppler is used to indicate vehicle speed from a remote fixed installation. In U.S. Pat. No. 2,996,137 to Chu et al, of Aug. 15, 1961 a system is disclosed which requires a guidance strip along the roadway and which does not use Doppler but does use a magic tee, as in the invention herein, but to determine range rather than Doppler frequencies.

SUMMARY OF THE INVENTION

In this invention, a vehicular radar system is self contained on a vehicle and includes an unmodulated RF transmitter-receiver with antenna means which is practical, low cost and rugged. Doppler frequencies are detected by a novel four terminal "Magic Tee" microwave junction, which is non-symmetrical to shift phase from the normal 180° out of phase of the side arms. The modified magic tee in cooperation with a one-shot circuit screens out any detected opening Doppler frequencies but passes any detected closing Doppler frequencies. A countdown capacitor screens out transitory obstacle frequencies such as a tree during a turn and upon a predetermined accumulation of cycles discharges to a second one-shot circuit. A powered braking mechanism on the vehicle is actuated by a series of pulses, the frequency depending on the closing rate, so that the vehicle is brought to a stop before striking the obstacle even though the operator could not have avoided a collision due to his reaction time.

The system of the invention does not purport to be all things to all men or to include the many exotic factors and components of certain prior art systems because such complicated arrangements are too costly to go into general use and too subject to failure in use. Instead the instant system seeks to automatically avoid collision with a vehicle ahead, when unobserved by an operator or when the operator could not react in time and does not seek to track vehicles, meausre range or distance or speed or otherwise accomplish unnecessary functions.

A novel over-ride circuit is provided, including a foot switch on the accelerator pedal to permit the judgment of the operator to prevail and prevent the use of the automatic system of the invention. The over-ride circuit is the solid state equivalent of a mechanical latching relay.

BRIEF DESCRIPTION OF THE DRAWING

FIG. 2 is a diagrammatic, enlarged perspective view of the asymmetrical magic tee of the invention.

FIG. 3 is a phantomed perspective view of the system of the invention installed in a vehicle.

FIG. 4 is a diagram of the modified one shot circuit of the invention, and

DESCRIPTION OF A PREFERRED EMBODIMENT

Figure 1:
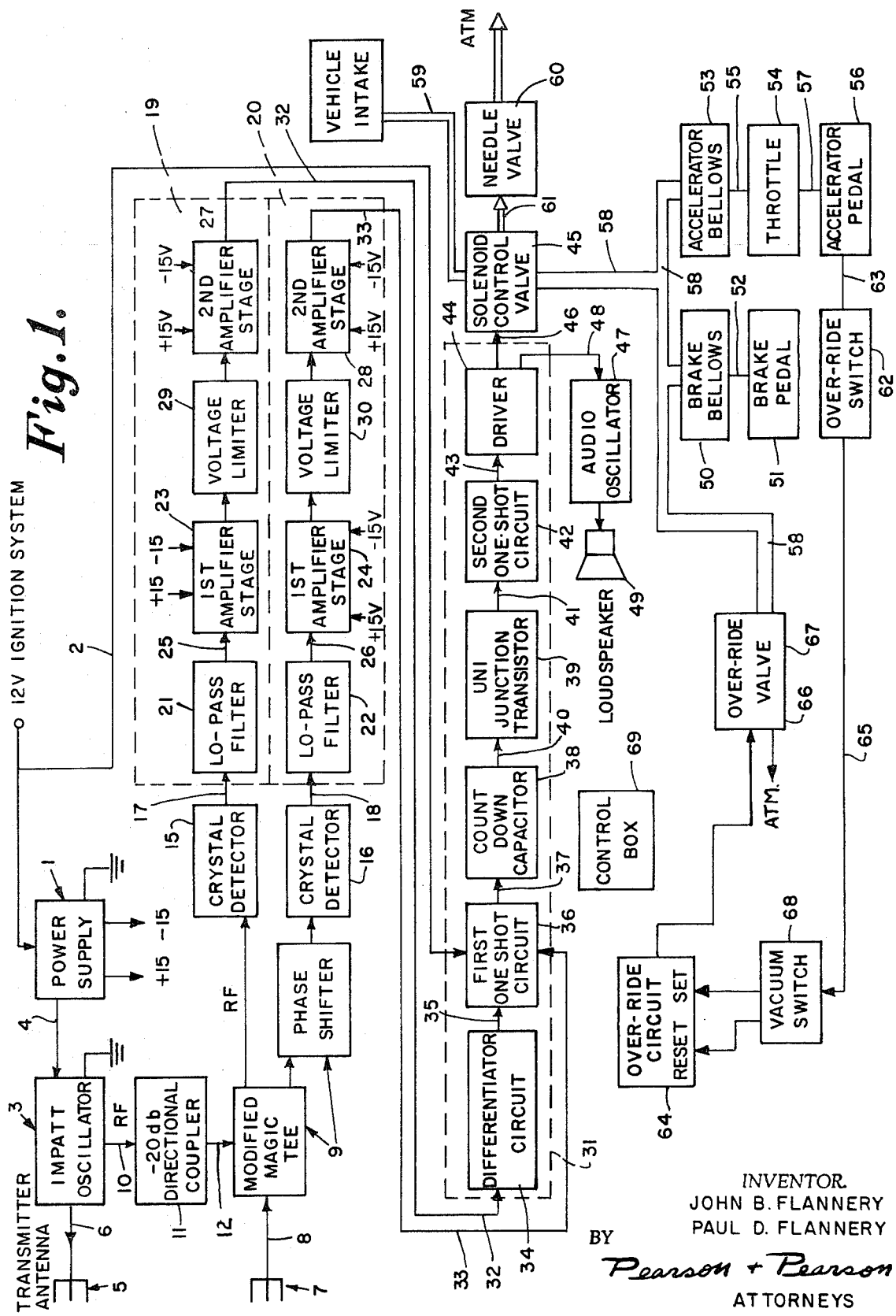
FIG. 1 is a schematic block diagram of the principal circuit of the invention.

In this invention as shown in FIG. 3, the conventional manually actuated brake pedal 51 and accelerator pedal 56 of a vehicle 70 are connected by linkages 52 and 55 so that automatic depression of the brake pedal causes automatic retraction of the accelerator pedal. Depression of the brake pedal 51 is accomplished by automatic powered means 71, in turn actuated by a series of electric pulses, the rate of which varies with vehicle speed. Preferably, when the vehicle 70 decreases the distance between itself and an obstacle in its path by an amount of 1.5 feet, the deceleration action is initiated. Thus a vehicle travelling at 45 miles per hour (66 feet per second), and having an average driver, whose reaction time is 1.5 seconds, would normally travel 99 feet before the driver could apply the brakes. With the circuit of this invention the brakes are applied in 1.5 feet due to the instant reaction of the circuit. At 60 miles an hour, the reaction time of the driver would take 132 feet while the circuit of the invention still initiates deceleration in 1.5 feet.

Referring to FIG. 1 the power supply 1 is energized by 12 volts from the vehicle's ignition system through connection 2. The power supply provides the bias voltage necessary to excite the impatt oscillator 3. This bias voltage is supplied on connecting line 4. The impatt oscillator 3 is the source of RF energy. Most of the energy originating from this source is coupled into the transmitter antenna 5 through electrical connection 6. The transmitter antenna 5 and a receiver antenna 7 are positioned in the forward portion of the vehicle. These antennas are highly directive so that they transmit energy and are sensitive to energy received from a relatively small angular sector directly in front of the vehicle. In this manner the radar system discriminates against obstacles or traffic in adjoining traffic lanes or off to the side of the roadway. Since the invention is intended to prevent collision with an obstacle directly in front of the vehicle, such discrimination is necessary. Any obstacle in front of the vehicle will reflect the transmitted energy back to the vehicle where it is picked up on receiver antenna 7. The received energy, by means of electrical connection 8 is coupled into a four terminal microwave device commonly called a magic tee 9. (FIG. 2) The energy is coupled in on what is normally referred to as the H arm of the tee. A small portion of the RF energy generated by the impatt oscillator 3 is coupled into the E arm of the magic tee, by means of electrical connection 10, -20 db directional coupler, 11 and electrical connection 12. The magic tee 9 is not the common type but rather has a unique modification. An asymmetry is introduced in the magic tee in such a manner that the RF energy propagated down the side arms of the tee, 13 and 14 respectively have a unique phase shift with respect to each other. In the standard magic tee, that is a symmetrical tee, the signals appearing in the side arms are out of phase with respect to each other by 180°. An explanation of the behavior of signals in a magic tee is treated extensively in the Technique of Microwave Measurements, Montgomery, Radiation Laboratory Series No. 11, McGraw-Hill 1947, Page 516. The invention modifies the magic tee to produce a phase relationship between the signals in side arms 13 and 14 which is other than 180°, and the sign of this phase shift is dependent on whether or not the received energy is higher or lower in frequency than the energy of the transmitted signal. As shown in FIG. 2, the asymmetry consists in the side arm 14 being longer than the side arm 13. If an obstacle is in the path of the vehicle and if this obstacle has a speed difference from the speed of the vehicle, then the received energy will have a frequency different from the transmitted frequency. This is the well known Doppler effect. If the relative velocity between the vehicle and the obstacle is positive, i.e., the distance between the vehicle and obstacle is decreasing, then the received energy will be higher in frequency than the transmitted frequency. However, if the velocity of the obstacle is negative, i.e., the distance between the obstacle and the vehicle is decreasing then the frequency of the received energy will be lower than the transmitter frequency. The former case is called closing Doppler, the latter case is called opening Doppler. The difference in frequency between the transmitted signal and the received signal is called the Doppler frequency and is directly proportional to the relative velocity between the vehicle and the obstacle.

From the foregoing discussion it is apparent that in each of the side arms, 13 and 14, of the magic tee, 9 there exists two RF signals and further there exists a unique phase relationship between the combination of signals in side arm 13 and side arm 14. This unique phase relationship is preserved in the detection process which follows.

Microwave crystal detectors 15 and 16 are mounted in side arms 13 and 14 respectively. These devices are conventional square law detectors. There are several components to the detected output. Reference is made here to Electronics by Thomas Benjamin Brown, John Wiley and Sons, 1954, Page 400. The above reference will show that all components of the detector output are high frequency of the RF type except for one component. The single component which is not RF is the relatively low frequency which is the difference between the transmitted frequency and the received frequency. This has been referred to above as the Doppler frequency. The outputs of the two detectors are fed to separate amplifier channels on electrical connections 17 and 18. The amplifiers are shown in FIG. 1 in dotted lines as 19 and 20.

If an obstacle is present directly in front of the vehicle and if this obstacle has a speed which is different from the vehicle speed, then there will be present on lines 17 and 18 signals of relatively low frequency, the frequency of which is directly proportional to the relative velocity between the vehicle and the obstacle. Further there exists between the signals on line 17 and line 18 a unique phase relationship which is neither 0° nor 180° and further the sign of the phase relationship is either positive or negative, depending on whether it is opening Doppler or closing Doppler. Now these signals on line 17 and line 18 are fed to low pass filters 21 and 22. These filters will pass signals whose frequency does not exceed a certain fixed value and this value is determined by the maximum Doppler frequency which will be anticipated in the operation of the system. For example, if the RF frequency transmitted is 10.5 ghz and if the maximum relative velocity to be detected is 140 miles per hour, then the maximum Doppler frequency will be 3500 hz. The purpose of these low pass filters is to reject any signals, no matter what their origin, which are not Doppler-generated. In this context they can be considered noise rejection devices. We here use the term "noise" in its broadest sense to include spurious electrical signals as might be generated in automobile ignition systems, in the electrical power supply, etc. The filtered outputs are fed to operational amplifiers 23 and 24 on lines 25 and 26. These are conventional operational amplifiers incorporating feed back to provide a voltage gain of approximately 200. The operational amplifiers receive bias voltages (+15 volts and −15 volts) from power supply 1. For certain weak signal conditions which occur when targets are at the extreme range or when the obstacle presents a poor reflecting surface, two stages of amplification are required in order to produce the square wave type signal which is required in the logic circuitry which follows. It is for this reason that the operational amplifiers 23 and 24 are duplicated at 27 and 28. However, in order to prevent overloading the inputs of operational amplifiers 27 and 28 conventional voltage limiting circuits are provided at 29 and 30 to provide the necessary protection for those cases where the detected signal is very large in amplitude either because the obstacle is at very close range and/or presents a very strong reflecting surface. The output of the two operational amplifiers 27 and 28 will be, for all cases, a square wave type signal whose frequency is the same as the output signal of the crystal detector. It is important to note that the unique phase relationship which existed at outputs of crystal detectors 15 and 16 is preserved at the outputs of the operational amplifiers 27 and 28. The net gain of the first and second amplifier stages is such to assure that any signal which exceeds the adjustable threshold of the first amplifier stage will saturate the second amplifier stage thus producing a square wave. Signals which do not exceed the threshold of the first stage will produce no output at the second stage.

The outputs of the amplifiers 19 and 20 are fed to the logic assembly shown in dotted lines as 31 in FIG. 1. The connections are made on lines 32 and 33. The function of the logic assembly is to process the amplified information received at the detectors 15 and 16. Specifically the functions of the logic assembly are to discriminate between opening and closing Doppler, to discriminate against false targets, to measure the relative velocity between the vehicle and obstacle and on the basis of this information to provide command signals to the deceleration control mechanism. The output of operational amplifier 27 shall hereafter be referred to as the signal channel. This square wave output is processed in a differentiating circuit 34. The function of the differentiating circuit is to produce a single positive-going voltage spike with a sharp leading edge for each complete square wave cycle. Thus in line 35, the output of the differentiating circuit will occur as a positive voltage spike for each complete Doppler cycle that was detected in crystal detector 15. It could be stated in other words that the repetition rate of the spike-like pulses occurring at the output of the differentiating circuit is identical to the detected Doppler frequency. This repetitive spike is fed to a modified one-shot circuit, 36 (FIG. 4) on connecting line 35. The operation of a conventional one-shot circuit is well known in the art. The operation of a conventional one-shot circuit is such that a sharp spike occurring at the input of the circuit will cause a square positive pulse of constant time duration at the output. This time duration is directly proportional to the value of capacitor C, in the circuit. The one-shot circuit utilized here, 36, has been modified as shown in FIG. 4. An NPN transistor has been added in line 33. This transistor will not conduct unless there is a potential on the base which is negative with respect to the emitter. In a sense then the transistor NPN performs the function of a switch and unless the switch is turned on, regardless of any signals which appear at the input of the one-shot circuit, there will be no output from the one-shot. It is at this point that we utilize the unique phase shift which was generated by the asymmetry of the modified magic tee 9, in order to discriminate between opening and closing Doppler. For the case of closing Doppler, that is, when the distance between the vehicle and obstacle is decreasing, then the square wave signal which appears on line 33 will be negative when the spike occurs on line 35. Thu for each spike which occurs corresponding to one complete Doppler cycle there will occur an output pulse on line 37, the output of the first one-shot circuit. However, due to the unique phase relationship mentioned above, when opening Doppler exists, that is, when the distance between the vehicle and the obstacle is increasing the spike will occur on the input to the first one-shot at a time when the signal on line 33 is positive. As mentioned above, under these conditions transistor NPN will not conduct and the one-shot will not fire. It can be seen from this discussion then that we have achieved the function of discriminating between opening and closing Doppler.

The next function to be achieved in the logic is to discriminate between valid targets and false targets. We define valid targets as those obstacles which present a danger of collision. False targets are those targets such as road barriers, sign post, traffic in adjacent lanes which appear in the field of view when in a turn, etc. All of the afore-mentioned false targets will generate Doppler signals. Most of the aforementioned false targets will be in the field of view for a relatively small number of Doppler cycles, whereas an obstacle which presents a definite danger of collision will be in the field of view constantly for a long period of time. Therefore, by demanding that a continuous train of a given number of cycles be recorded before any braking action is initiated, we are effectively discriminating against those targets which come into the field of view for only short periods of time. This function is accomplished in the countdown capacitor 38 and the uni-junction transistor 39 connected by line 40. The uni-junction transistor is a device which gives a spike-like output when the potential on the input exceeds a certain threshold. Thus, we allow the successive outputs of the first one-shot to build up the potential on the countdown capacitor. If a valid target exists then the output of the first one-shot 36 will be a continuous train of square pulses. Each of these pulses will add to the potential of the countdown capacitor 38. When the potential on this capacitor reaches the threshold of the uni-junction transistor 39, a spike-like output will occur on line 41. As will be explained below this spike-like output will initiate one deceleration impulse. However, we should note that the above discussion points out that a degree of false target discrimination is achieved in the combination of the countdown capacitor 38 and the uni-junction transistor 39. If a false target does appear in the field of view for a short period of time, a number of one-shot output pulses will start charging the countdown capacitor, but when the false target disappears from the field of view, no further charge will accumulate on the capacitor and the capacitor will discharge its potential without firing the uni-junction transistor 39 and as a result no deceleration impulse will occur.

The second one-shot circuit 42 is a conventional one-shot and its function is to generate a pulse which will actuate the deceleration mechanism. More specifically, after the target discrimination has occurred in the previous stage of the logic a valid target will fire the second one-shot and in turn the second one-shot will generate a positive going square pulse. The time duration of this output pulse which will occur on line 43 is controllable by varying the value of the capacitor in the second one-shot circuit. This output pulse in turn controls the driver stage 44. Driver stage 44 is simply a transistor acting as a switch with a normally closed position. The transistor in the driver stage is switched to its conducting state by the square pulse on line 43. The driver stage provides a conductive path to ground for the control valve 45 through connection 46. Thus when the driver is in its non-conducting state the solenoid control valve 45 is in its closed position and any pulse originating from the second one-shot circuit will in turn switch the driver stage to its conducting state and this in turn will cause the solenoid control valve 45 to operate to the open position. The valve will remain open so long as the driver stage is conducting. The driver stage will cease to conduct at the trailing edge of the square output pulse from the second one-shot circuit. The driver stage also provides a conductive path to ground for the audio oscillator 47 through connection 48. The audio oscillator in turn causes the loud speaker 49 to emit an audible signal to serve as a warning to the vehicle operator. The loud speaker emits an audible pulse concurrent with each deceleration impulse.

The actuation of the controls to achieve deceleration is accomplished in the method described below. A vaccum bellows 50 is mechanically linked to the brake pedal 51 by a linkage shown at 52. A second vacuum bellows 53 is mechanically linked to the throttle 54 on the carburator assembly by means of linkage 55 and this throttle in turn is mechanically linked to the accelerator pedal 56 through existing linkage in the vehicle shown as 57. A vacuum hose 58 links the two bellows 50 and 53 to the solenoid control valve 45. The solenoid control valve 45 is a three-way valve. The exhaust port which is normally closed is connected to the engine intake manifold through a vacuum line indicated as 59. The exhaust port which is normally open is connected to a needle valve 60 through a vacuum line 61, and the needle valve is in turn opened to atmospheric pressure.

It can be seen then that in the normal position of the solenoid control valve, that is to say, when there is no current flowing in the coil the two bellows are opened to atmosphere and there is no restriction on the movement on either the brake pedal or accelerator. However, when the driver stage 44 causes the solenoid control valve 45 to conduct for an instant the exhaust port in the valve 45 which is normally opened to atmosphere is closed and the exhaust port which is normally closed is opened to the engine intake manifold. The vacuum causes air to be evacuated from the two bellows. This evacuation of air continues during that brief duration of time that the driver stage is conducting, or more specifically, the time duration of a single deceleration impulse is precisely that of the second one-shot circuit output. In actual practice the time duration is quite short, on the order of milli-seconds. The effect of this is to cause a slight depression of the brake pedal and a slight upward thrust of the accelerator pedal. This process is repeated for each braking impulse. A series of braking impulses in rapid succession will cause the brake and accelerator pedals to move to their extreme positions. The speed with which this occurs will be a direct function of the repetition rate of the output of the second one-shot circuit and as can be seen from the previous discussion this is in direct proportion to the Doppler frequency. Extending it further it can be seen that the speed of the deceleration action is in direct proportion to the relative velocity between the vehicle and obstacle.

Figure 5:
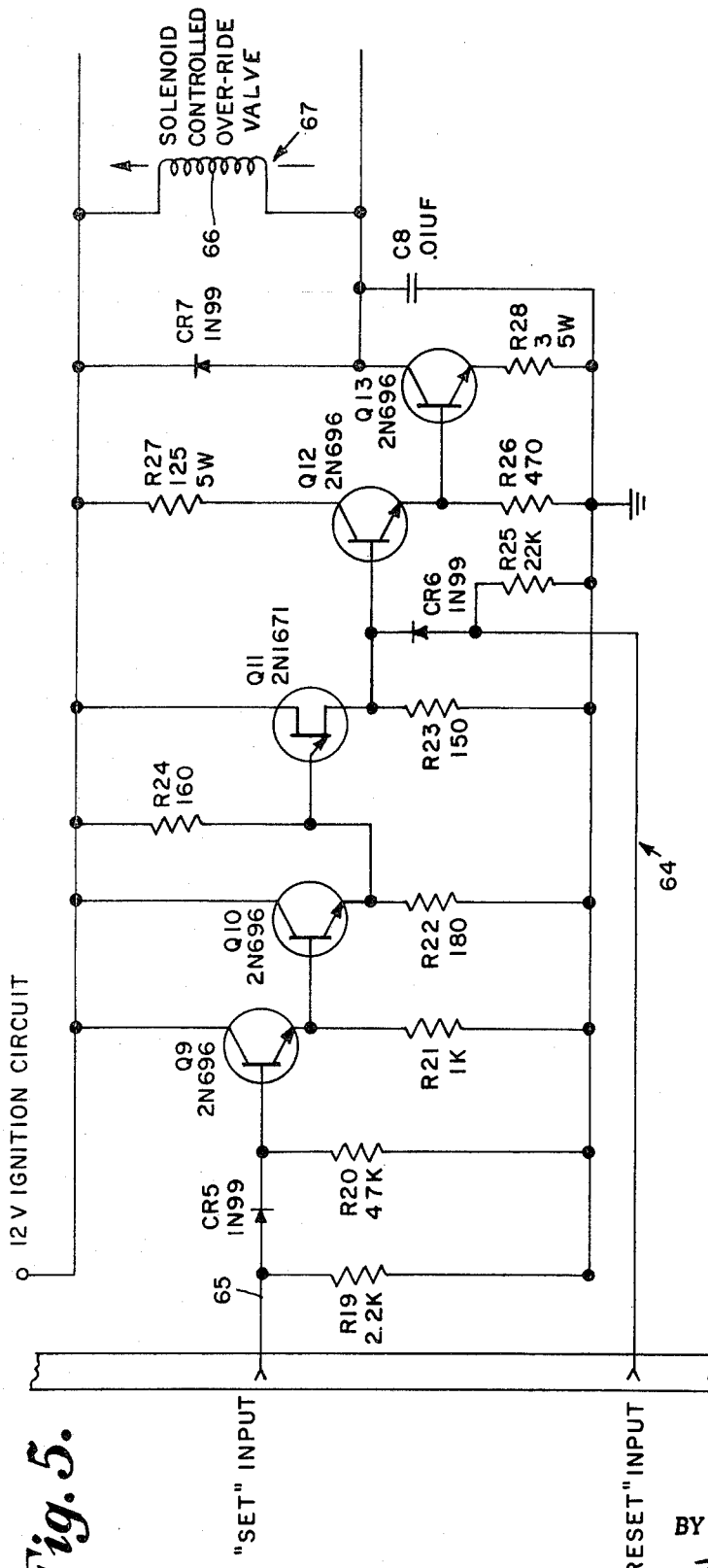
FIG. 5 is a diagram of the over-ride circuit of the invention.

It is recognized that in the course of events there will be situations wherein the system initiates a braking action, but due to existing conditions braking action would be unwise. Such conditions would be occurrance of false targets which would penetrate the target discrimination circuit because of their persistance in the field of view or a condition where automatic braking was initiated on a road surface which was slippery due to weather conditions. Other conditions will become apparent wherein it is conceivable that the operator's judgment should prevail. To accomodate this situation an over-ride feature is incorporated in the invention. A microswitch 62 is mounted on the accelerator pedal as shown by connection 63. The placement of the switch is to make it readily accessible to the operator. The over-ride switch delivers a spike-like pulse to the over-ride circuit, 64 through connection 65. The over-ride circuit is the solid state or transistorized equivalent of a mechanical latching relay. The over-ride circuit is shown in detail in FIG. 5. The circuit when energized by a spike-like pulse from the over-ride switch fed to the "set" input of the over-ride circuit causes the over-ride valve coil 66 to conduct, thus opening the valve to atmospheric pressure and immediately releasing any vacuum which might be present in the two actuating bellows 50 and 53. The current continues to flow in the coil of the solenoid valve keeping the valve open and thereby maintaining an over-ride condition until such time as a second spike-like pulse is delivered to the "reset" input of the over-ride circuit. The "reset" pulse causes the current in the coil of the solenoid valve 67 to cease flowing thereby closing the valve and effectively taking the system out of the over-ride condition. A vacuum switch 68 in the line 65 between the over-ride switch and the over-ride circuit determines whether the spike-like pulse from the over-ride switch 62 is delivered to either the "set" or "reset" input of the over-ride circuit. In this manner the vacuum switch prevents the system being put into an over-ride condition until such time as there is a vacuum in the system. This is an important factor because as stated previously the over-ride switch 62 is mounted on the accelerator pedal so as to be easily accessible to the operator. In being readily accessible it is subject to inadvertently being tripped by the operator during normal operation. By use of the vacuum switch we prohibit the operator from unknowingly de-activating the braking system in normal driving conditions. However, as soon as braking action occurs the over-ride circuit is enabled so that operator can immediately accomplish over-ride.

The control console 69 provides several functions including the following: On/off control, mode switch which enables the operator to choose between full automatic braking operation or alternatively an audible warning mode wherein the action of the control valve 45 is prohibited and the system delivers only an audible signal to provide a warning signal to the operator an impending dangerous situation. Operation in this latter mode is recommended when the vehicle is being operated under consistently slippery road conditions where the operator's judgment in braking the vehicle in order to provide a controlled stop is preferred instead of control of the braking by the automatic system. The control box 69 also provides volume control to adjust the level of the output of loud speaker 49. It further provides for a selection of mode as applies to existing traffic conditions, specifically, two modes of operation are available to the operator, identified as either Town or Country. When operating at consistently slow speeds, as in congested town or city traffic conditions, the distance required for stopping the vehicle is obviously less than that which is required for high-speed turnpike conditions. Therefore, it is possible to reduce the range of the system under these conditions without effecting the over-all safety and provide for smoother operation in these congested traffic conditions. In the country mode position the system is sensitive to obstacles at a much greater range as is required in order to accomplish safe stopping of the vehicle at high speed.

What is claimed is:

1. A vehicular radar system for automatically decelerating or stopping a vehicle to avoid a collision with an obstacle in an emergency stop situation, said system comprising:
    transmitter-receiver means mounted on said vehicle to beam an unmodulated, CW electro-magnetic signal along the path of said vehicle and to receive reflections of the transmitted signal from any obstacle in said path;
    means for detecting the Doppler signal caused by relative velocity between said vehicle and obstacle;
    asymmetrical magic tee means for discriminating between such detected opening and closing Doppler signals and responding only to closing Doppler signals,
    automatic powered means actuated by electric signal means for decelerating or stopping said vehicle, and
    means responsive only to the frequency of said closing Doppler signals and independent of any other parameters for energizing said electric signal means at a frequency in direct proportion to the relative velocity of said vehicle and obstacle
    whereby a collision is avoided by substituting the relatively short reaction time of the Doppler sensing radar system for the relatively long reaction time of the operator.

2. A vehicular radar system as specified in claim 1 plus
    means responsive to said closing Doppler discrimination means for sensing a continuous train of cycles accumulating to a predetermined value, before energizing said electric signal means;
    whereby non-dangerous, temporary obstacles, in the path of said vehicle, do not cause a braking response in said system.

3. A vehicular radar system as specified in claim 1 plus:
    over-ride circuit means on said vehicle, including a switch proximate the accelerator pedal of said vehicle, actuation of said switch energizing said circuit means to disassociate said system from said automatic powered means and permit the operator to assume full control of said vehicle.

4. A vehicular radar system as specified in claim 1, wherein:
    said asymmetrical magic tee means for discriminating between detected opening and closing Doppler signals includes an asymmetrical magic tee, separating the detected Doppler signal into two components having a phase shift other than 0° or 180° with respect to each other and changing the polarity of the phase relationship as a function of opening or closing Doppler, and includes a differentiating circuit for discriminating between said opening and closing Doppler.

5. A vehicular radar system as specified in claim 1, wherein:
    said asymmetrical magic tee means for discriminating between detected opening and closing Doppler signals includes an asymmetrical magic tee, separating said signals into two components, with a predetermined abnormal phase shift, and switch means including a one-shot circuit including a transistor, said transistor becoming conductive to cause said one-shot circuit to fire only when closing Doppler exists.

6. A vehicular radar system as specified in claim 1, wherein:
    said vehicle includes a brake pedal and an accelerator pedal, said automatic powered means includes a mechanical linkage between said pedals arranged to retract said accelerator pedal when said brake pedal is depressed and said electric signal means includes a series of electric pulses arranged to automatically depress said brake pedal at a rate which varies with vehicle speed.

7. In a vehicular radar system for actuation in emergency stop situations, the combination of:
    automatic powered means, responsive to electric signal means, for decelerating a vehicle;
    transmitter-receiver means mounted on said vehicle to transmit and receive unmodulated RF energy in a relatively small angular sector directly in front of the vehicle for reflection from an obstacle in said sector;
    electronic means for sensing opening and closing Doppler in said reflections, and responding only to closing Doppler frequencies;
    electronic means responsive to said closing Doppler frequencies for sensing true and false obstacles and responding to true obstacles, located in said path for a predetermined period, and
    electric signal means responsive only to closing Doppler frequencies, reflected from true obstacles for at least said predetermined time, and independent of any other parameters for repeatedly energizing said automatic powered deceleration means in pulses at a frequency directly proportional to said closing Doppler frequencies and to the relative velocity between said vehicle and said obstacle
    whereby a collision is avoided by substituting the relatively short reaction time of the Doppler sensing radar system for the relatively long reaction time of the operator and actuation is not dependent on input from moving parts of the vehicle.

8. A vehicular radar system for screening out opening movements while sensing closing movements between a vehicle and an obstacle in the path thereof, said system comprising:
  combined RF signal transmitter-receiver means on said vehicle for reflecting a signal from said obstacle, said means including Doppler detection means;
  power actuated deceleration means on said vehicle controlled by electric signal means;
  asymmetrical magic tee means for discriminating between opening and closing detected Doppler, frequencies in the reflections of said RF signal means, and for emitting electrical signals only when closing Doppler signals are so detected;
  closure rate detection means for sensing the frequency of said detected closing Doppler signals and
  means responsive only to said closure rate detection means and independent of any other factors, for energizing said electric signal means in pulses directly proportional to the closing Doppler frequency so detected;
  whereby said vehicle will be pulse decelerated at a frequency of pulsation depending only on its rate of approach toward said obstacle.

9. In a radar system of the type utilizing the Doppler effect:
  asymmetrical magic tee means for discriminating between opening and closing Doppler in the detected audio frequencies said means
  comprising the generating of a unique phase relationship between two detected Doppler signals, the polarity of said phase relationship being dependent on the sign of the relative velocity,
  and means responsive only to closing Doppler signals so discriminated, and free of all other parameters, for energizing electric signal means in pulses directly proportional to the closing Doppler frequencies so detected.

* * * * *